US012609131B2

(12) United States Patent
Berisha et al.

(10) Patent No.: US 12,609,131 B2
(45) Date of Patent: Apr. 21, 2026

(54) TRACKING ARTICULATORY AND PROSODIC DEVELOPMENT IN CHILDREN

(71) Applicants:Arizona Board of Regents on behalf of Arizona State University, Scottsdale, AZ (US); Wisconsin Alumni Research Foundation, Madison, WI (US); Aural Analytics, Inc., Scottsdale, AZ (US)

(72) Inventors: Visar Berisha, Tempe, AZ (US); Julie Liss, Scottsdale, AZ (US); Katherine Hustad, Madison, WI (US); Tristan Mahr, Sun Prairie, WI (US); Kan Kawabata, Tempe, AZ (US)

(73) Assignees: Arizona Board of Regents on Behalf of Arizona State University, Tempe, AZ (US); Wisconsin Alumni Research Foundation, Madison, WI (US); Linus Health, Inc., Boston, MA (US)

( * ) Notice: Subject to any disclaimer, the term of this patent is extended or adjusted under 35 U.S.C. 154(b) by 653 days.

(21) Appl. No.: 17/764,054

(22) PCT Filed: Sep. 28, 2020

(86) PCT No.: PCT/US2020/053084
§ 371 (c)(1),
(2) Date: Mar. 25, 2022

(87) PCT Pub. No.: WO2021/062370
PCT Pub. Date: Apr. 1, 2021

(65) Prior Publication Data
US 2022/0415308 A1     Dec. 29, 2022

Related U.S. Application Data

(60) Provisional application No. 62/906,868, filed on Sep. 27, 2019.

(51) Int. Cl.
G10L 25/51 (2013.01)
G10L 15/02 (2006.01)
(Continued)

(52) U.S. Cl.
CPC .............. G10L 25/51 (2013.01); G10L 15/02 (2013.01); G10L 15/187 (2013.01); G10L 15/22 (2013.01);
(Continued)

(58) Field of Classification Search
CPC ....... G10L 15/187; G10L 15/02; G10L 15/22; G10L 15/30; G10L 25/18; G10L 2015/025; G10L 25/66; G10L 15/26
See application file for complete search history.

(56) References Cited

U.S. PATENT DOCUMENTS

| | | | |
|---|---|---|---|
| 8,494,857 B2 * | 7/2013 | Pakhomov | .............. G10L 17/26 704/271 |
| 10,223,934 B2 * | 3/2019 | Paul | ....................... G09B 19/04 |

(Continued)

OTHER PUBLICATIONS

Minelga, Jonas. "Computational intelligence methods for non-invasive larynx pathology screening." PhD diss., Kauno technologijos universitetas., 2018. (Year: 2018).*
(Continued)

*Primary Examiner* — Douglas Godbold
(74) *Attorney, Agent, or Firm* — Polsinelli PC

(57) ABSTRACT

Systems, devices, and methods for tracking articulatory and prosodic development in children are disclosed. Human speech in a given language can be divided into phonemes, which are a sound or group of sounds perceived by speakers of the language to have a common linguistic function (e.g., consonant sounds, vowel sounds). In an exemplary aspect, a normative model can be generated for production characteristics of each phoneme in a given language using a database of normative speech samples. One or more speech samples of a human subject can be analyzed to identify the phonemes used by the human subject and measured against the normative model. Based on this analysis, a normed score is generated of the articulation accuracy, duration, rhythm, volume, and/or other production characteristics for each phoneme of the speech sample of the human subject.

21 Claims, 8 Drawing Sheets

(51) Int. Cl.

| | |
|---|---|
| *G10L 15/187* | (2013.01) |
| *G10L 15/22* | (2006.01) |
| *G10L 15/30* | (2013.01) |
| *G10L 25/18* | (2013.01) |

(52) U.S. Cl.
CPC .............. *G10L 15/30* (2013.01); *G10L 25/18* (2013.01); *G10L 2015/025* (2013.01)

(56) References Cited

U.S. PATENT DOCUMENTS

| | | | | |
|---|---|---|---|---|
| 10,332,417 B1* | 6/2019 | Brown | ..................... | G09B 5/12 |
| 2007/0055523 A1* | 3/2007 | Yang | ..................... | G09B 19/06 704/E21.019 |
| 2021/0134277 A1* | 5/2021 | Arora | ..................... | G10L 15/02 |

OTHER PUBLICATIONS

Grossinho A, Guimaraes I, Magalhaes J, Cavaco S. Robust phoneme recognition for a speech therapy environment. In2016 IEEE International Conference on Serious Games and Applications for Health (SeGAH) May 11, 2016 (pp. 1-7). IEEE. (Year: 2016).*

Extended European Search Report issued is corresponding Application No. 20867343.4 on Apr. 21, 2023, 7 pages.

Shahin et al., Tabby Talks: An automated tool for the assessment of childhood apraxia of speech, Speech Communication, vol. 70, pp. 49-64.

Saxon et al., Objective Measure of Plosive Nasalization in Hypernasal Speech, ICASSP 2019—2019 IEEE International Conference on Acoustics, Speech and Signal Processing (ICASSP), 12 Ma 2019, pp. 6520-6524.

Witt, S.M. et al., "Phone-level pronunciation scoring and assessment for interactive language learning," Speech Communication, vol. 30, No. 2-3, Feb. 20, 1998, pp. 95-108.

European Patent Office, Examination Report, Application No. 20867343. 4, Mar. 12, 2025, 9 pages.

* cited by examiner $$\text{PhonemePrecision}(K_j) = \log\left(\frac{\Pr(K_j)}{\max \Pr}\right)$$

$$PLLR(k_j) = \log \left( \frac{P(acoustics \mid k)}{\max\limits_{\substack{\text{all phonemes } p}} P(acoustics \mid p)} \right) \quad \begin{array}{l} \text{likelihood of } \textit{target} \text{ phoneme} \\ \text{likelihood of } \textit{produced} \text{ phoneme} \end{array}$$

TRACKING ARTICULATORY AND PROSODIC DEVELOPMENT IN CHILDREN

RELATED APPLICATIONS

This application claims the benefit of U.S. provisional patent application Ser. No. 62/906,868, filed Sep. 27, 2019, the disclosure of which is hereby incorporated herein by reference in its entirety.

GOVERNMENT SUPPORT

This invention was made with government support under DC015653, DC009411, and R01 DC006859 awarded by National Institutes of Health. The government has certain rights in the invention.

FIELD OF THE DISCLOSURE

The present disclosure relates to audio processing of human speech.

BACKGROUND

Speech and language development in children has been a recent topic of increasing study. Many children experience delays and other problems in the development of speech and language. Traditional methods of detecting and diagnosing issues in speech and language development involve face-to-face evaluation sessions between specially trained pathologists and patients. Children may be referred for speech and language evaluations by medical professionals, parents, caregivers, and/or teachers. However, referrals often rely on subjective measures, such as questionnaires, and are not systematically administered. As a result, many children with speech and/or language difficulties are not referred for evaluation in a timely manner, and results of clinical evaluation are subject to significant variation due to the subjective character of speech evaluation by clinicians.

For example, about half of children with cerebral palsy (CP) have dysarthria, which has well-documented negative effects on intelligibility and negative consequences for functional communication, social participation, educational attainment, and quality of life. Research has consistently identified the articulatory subsystem as the single largest contributor to intelligibility deficits in dysarthria, implicating acoustically measured variables such as vowel space and second-formant frequency slope. However, research tools used for acoustic measurement cannot be applied to clinical assessment because they are time-consuming, require specialized software and/or hardware, and scientific expertise in speech acoustics to reliably extract and interpret data.

In contrast, gold standard clinical tools for assessing articulation in children are standardized tests, which even today employ the same methods used since their inception in the 1940s and 1950s. Standardized clinical articulation tests require an expert to make binary or categorical perceptual judgements of production accuracy for every phoneme in a child's repertoire, and have significant reliability challenges that limit their usefulness for assessing the speech of children with dysarthria. Binary or categorical judgements do not allow for fine-grained continuous quantification of distance from typical expectations per phoneme, or for quantification of change associated with development or intervention. Additionally, articulation tests typically rely on production of one token and thus do not reflect within-child variability.

Height and weight are measured each time a child visits a pediatrician or other physician. These easy-to-interpret measures are projected on normative distributions and provide doctors and parents with objective information regarding the child's development. However, there are no existing well-accepted tools for objectively assessing the speech development of children in a way similar to tracking height and weight.

SUMMARY

Systems, devices, and methods for tracking articulatory and prosodic development in children are disclosed. The critical gap between what is known from the research domain and clinical tools that can be applied to assess articulation (e.g., for childhood dysarthria and other conditions) is a key barrier that compromises the efficiency and effectiveness of clinical practice, potentially resulting in diminished outcomes. Embodiments described herein bridge the research to clinical application gap by applying machine learning for acoustic modeling and speech analytics to assess articulation of human subjects.

Human speech in a given language can be divided into phonemes, which are a sound or group of sounds perceived by speakers of the language to have a common linguistic function (e.g., consonant sounds, vowel sounds). In an exemplary aspect, a normative model can be generated for production characteristics of each phoneme in a given language using a database of normative speech samples. One or more speech samples of a human subject can be analyzed to identify the phonemes used by the human subject and measured against the normative model. Based on this analysis, a normed score is generated of the articulation accuracy, duration, rhythm, volume, and/or other production characteristics for each phoneme of the speech sample of the human subject.

Articulation measurements disclosed herein are not based on difficult-to-estimate quantities such as formant frequencies. Instead, embodiments specify a phoneme log-likelihood ratio (PLLR) for each phoneme in a language sample. The PLLR is used to create normative growth curves for the development of articulatory precision by phoneme in typical children, and then is used to characterize the contribution of individual phonemes to speech intelligibility in order to identify how human subjects with articulation issues (e.g., children with dysarthria or other speech or developmental disorders) differ from typical adults and/or children and which phonemes will have the largest impact on intelligibility if remediated.

An exemplary embodiment provides a method for processing a speech sample of a human subject, the method comprising: extracting a plurality of spectro-temporal patterns from the speech sample of the human subject; and for each given phoneme of a plurality of phonemes: utilizing the plurality of spectro-temporal patterns to identify a plurality of instances of the given phoneme; comparing each of the plurality of instances of the given phoneme with a model of the given phoneme to produce an estimate of correct pronunciation for the given phoneme; and comparing the estimates of correct pronunciation using a statistical model to produce a normed score.

Another exemplary embodiment provides a method for assessing speech of a human subject, the method comprising: receiving a first speech sample of the human subject; spectrally sampling the first speech sample; analyzing the spectrally sampled first speech sample to separate the first speech sample into a plurality of instances of a plurality of phonemes; and for each given phoneme of the plurality of phonemes: comparing each of the plurality of instances of the given phoneme with a model of the given phoneme to produce an estimate of correct pronunciation; and generating a normed score for the given phoneme using a statistical model and the estimates of correct pronunciation.

Another exemplary embodiment provides a speech processing system, comprising: a database comprising normative acoustic data for a plurality of phonemes; and audio processing circuitry coupled to the database and configured to: produce a model of each of the plurality of phonemes based on the normative acoustic data; receive a speech sample comprising a plurality of instances of each of the plurality of phonemes; and for each given phoneme: spectrally analyze the speech sample to identify the plurality of instances of the given phoneme; and compare the plurality of instances of the given phoneme to the model of the given phoneme to produce a normed score for the given phoneme.

Various aspects and features disclosed herein may be combined for further advantage. Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
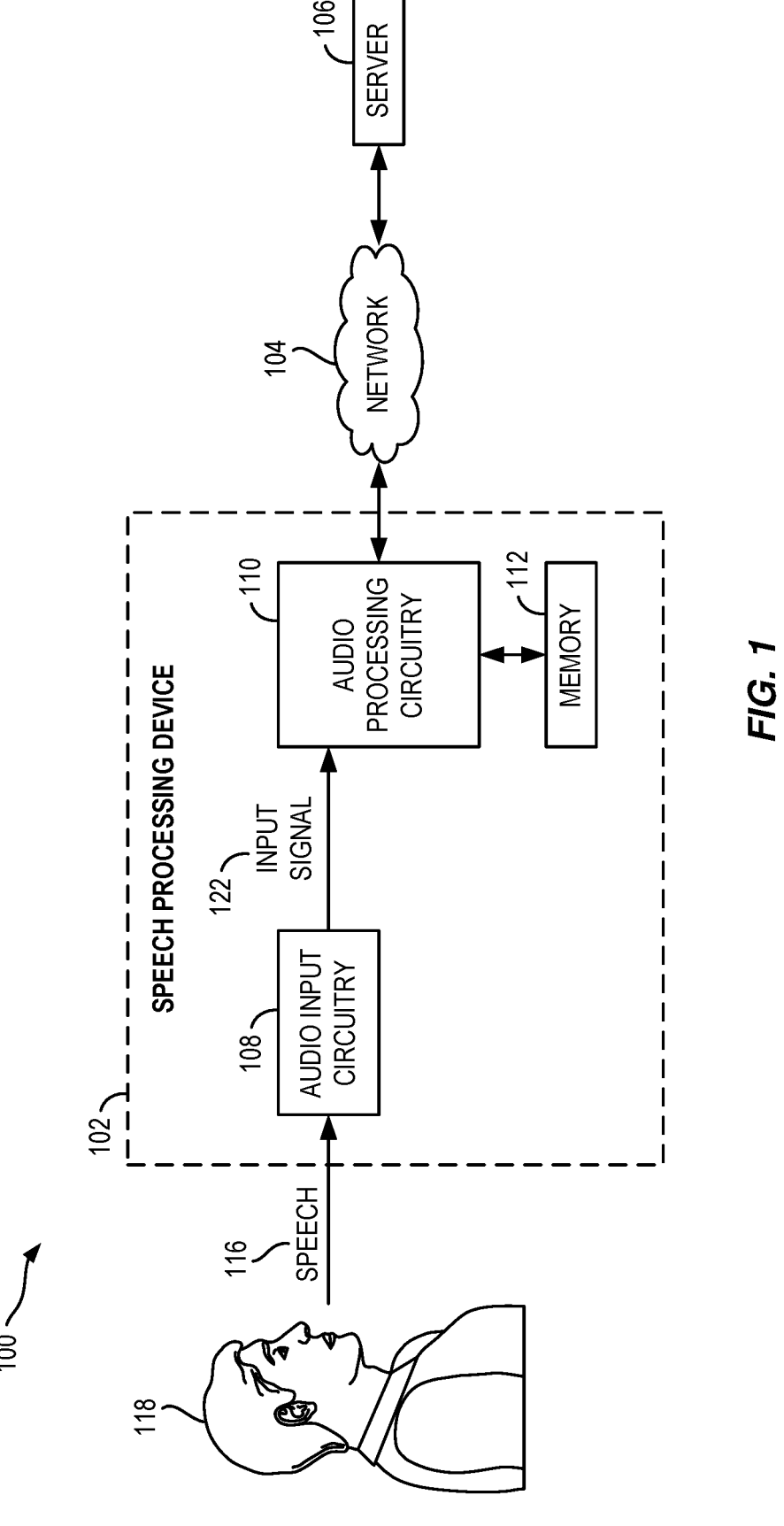
FIG. 1 is a schematic diagram of an exemplary speech processing system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Systems, devices, and methods for tracking articulatory and prosodic development in children are disclosed. The critical gap between what is known from the research domain and clinical tools that can be applied to assess articulation (e.g., for childhood dysarthria and other conditions) is a key barrier that compromises the efficiency and effectiveness of clinical practice, potentially resulting in diminished outcomes. Embodiments described herein bridge the research to clinical application gap by applying machine learning for acoustic modeling and speech analytics to assess articulation of human subjects.

Human speech in a given language can be divided into phonemes, which are a sound or group of sounds perceived by speakers of the language to have a common linguistic function (e.g., consonant sounds, vowel sounds). In an exemplary aspect, a normative model can be generated for production characteristics of each phoneme in a given language using a database of normative speech samples. One or more speech samples of a human subject can be analyzed to identify the phonemes used by the human subject and measured against the normative model. Based on this analysis, a normed score is generated of the articulation accuracy, duration, rhythm, volume, and/or other production characteristics for each phoneme of the speech sample of the human subject.

Articulation measurements disclosed herein are not based on difficult-to-estimate quantities such as formant frequencies. Instead, embodiments specify a phoneme log-likelihood ratio (PLLR) for each phoneme in a language sample. The PLLR is used to create normative growth curves for the development of articulatory precision by phoneme in typical children, and then is used to characterize the contribution of individual phonemes to speech intelligibility in order to identify how human subjects with articulation issues (e.g., children with dysarthria or other speech or developmental disorders) differ from typical adults and/or children and which phonemes will have the largest impact on intelligibility if remediated.

FIG. 1 is a schematic diagram of an exemplary speech processing system 100 which includes a speech processing device 102, a network 104, and a server 106. The speech processing device 102 comprises audio input circuitry 108, audio processing circuitry 110, and memory 112. The audio input circuitry 108 and memory 112 may be coupled with the audio processing circuitry 110 via wired connections, wireless connections, or a combination thereof. The speech processing device 102 may further include a behind-the-ear device, an ear-mold device, a headset, a headband, a smartphone, or a combination thereof. In an exemplary aspect, the speech processing device 102 and/or the server 106 is configured to assess articulation and/or prosody of a speech sample 116 from a human subject 118.

The audio input circuitry 108 may comprise at least one microphone. In certain embodiments, the audio input circuitry 108 may comprise a bone conduction microphone, a near field air conduction microphone array, or a combination thereof. The audio input circuitry 108 may be configured to provide an input signal 122 that is indicative of the speech sample 116 provided by the human subject 118 to the audio processing circuitry 110. The input signal 122 may be formatted as a digital signal, an analog signal, or a combination thereof. In certain embodiments, the audio input circuitry 108 may provide the input signal 122 to the audio processing circuitry 110 over a personal area network (PAN). The PAN may comprise Universal Serial Bus (USB), IEEE 1394 (FireWire) Infrared Data Association (IrDA), Bluetooth®, ultra-wideband (UWB), Wi-Fi Direct, or a combination thereof. The audio input circuitry 108 may further comprise at least one analog-to-digital converter (ADC) to provide the input signal 122 in digital format. In certain embodiments, the audio processing circuitry 110 further includes level detect circuitry, adaptive filter circuitry, voice recognition circuitry, or a combination thereof.

The audio processing circuitry 110 includes a processor (e.g., an electrically operated microprocessor configured to execute a pre-defined and/or a user-defined machine readable instruction set, such as may be embodied in computer software) configured to receive the input signal 122. The audio processing circuitry 110 may include a communication interface (not shown) coupled with the network 104. The communication interface may comprise circuitry for coupling to the PAN, a local area network (LAN), a wide area network (WAN), or a combination thereof.

The audio processing circuitry 110 may be further configured to store the speech sample 116 (e.g., as represented by the input signal 122) in the memory 112. The memory 112 may be a non-volatile memory, a volatile memory, or a combination thereof. The memory 112 may be wired to the audio processing circuitry 110 using an address/data bus. In certain embodiments, the memory 112 may be portable memory coupled with the processor via the PAN.

The audio processing circuitry 110 may be further configured to send the speech sample 116 to the network 104, wherein the network 104 sends the speech sample 116 to the server 106. In certain embodiments, the processor may be further configured to append to the record a device identifier, a user identifier, or a combination thereof. The device identifier may be unique to the speech processing device 102. The user identifier may be unique to the human subject 118. The device identifier and the user identifier may be useful to a physician, speech pathologist, or other medical or speech professional, wherein the human subject 118 may be a patient of the physician, speech pathologist, or other medical or speech professional.

The network 104 may comprise a PAN, a LAN, a WAN, or a combination thereof. The PAN may comprise USB, IEEE 1394 (FireWire) IrDA, Bluetooth, UWB, Wi-Fi Direct, or a combination thereof. The LAN may include Ethernet, 802.11 WLAN, or a combination thereof. The network 104 may also include the Internet.

The server 106 may comprise a personal computer (PC), a local server connected to the LAN, a remote server connected to the WAN, a cloud-based server, or a combination thereof. In certain embodiments, the server 106 may be a software-based virtualized server running on a plurality of servers. In some embodiments, the audio processing circuitry 110 and/or the memory 112 are implemented in the server 106.

Figure 2:
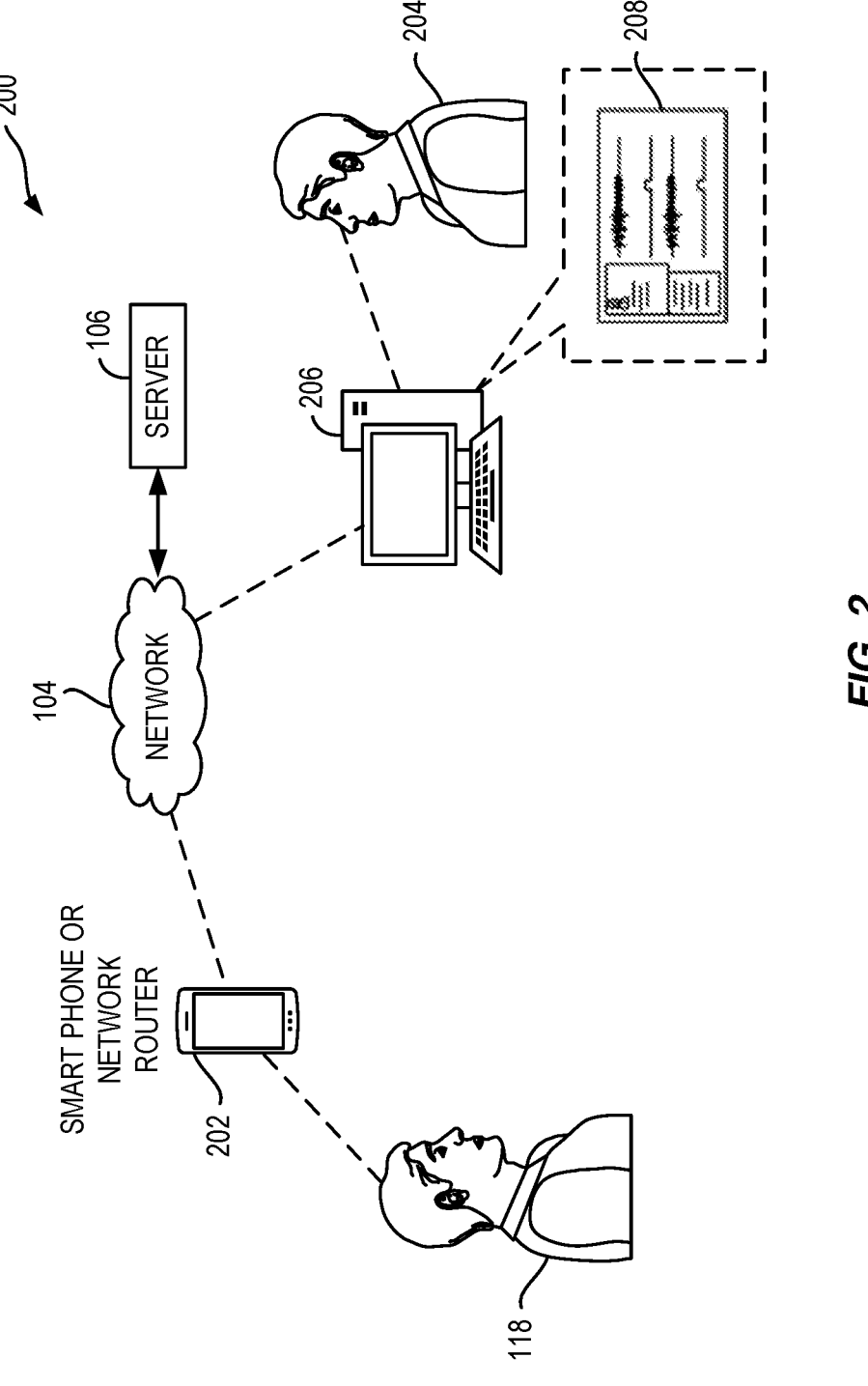
FIG. 2 is a schematic diagram of another exemplary speech processing system.

FIG. 2 is a schematic diagram of another exemplary speech processing system 200 with a speech sample being received through a user device 202. In this example, the speech processing is performed remotely via the server 106 connected to the network 104, and results are provided to a speech pathologist 204 or other professional via a client device 206. In other examples, at least some of the speech processing may be performed locally. Each of the user device 202 and the client device 206 may be a PC, a smartphone, or a tablet device. The user device 202 may include or be connected to the audio input circuitry 108 of FIG. 1. In some examples, the user device 202 includes a portion of the audio processing circuitry 110 while the server 106 includes another portion of the audio processing circuitry 110.

The client device 206 provides the speech pathologist 204 (or another user, such as a parent or teacher) with a graphical administrator interface (GAI) portal 208 for presenting results of a method for processing the speech sample (detailed further below with respect to FIG. 3). In certain embodiments, the GAI portal 208 permits the speech pathologist 204 with an assessment of the speech analysis, and may further provide longitudinal data for the human subject 118. Such data may be used for diagnosis and/or treatment of the human subject 118. In certain embodiments, the GAI portal 208 further includes patient information and/or treatment data. In certain embodiments, patient information comprises one or more of age, gender, patient identifier, etc.

In an exemplary aspect, the speech processing system 100 of FIG. 1 or the speech processing system 200 of FIG. 2 may provide objective measures of a speech sample 116 which can be compared against normative data (e.g., age-based developmental norms) to produce a normed score. As described herein, a normed score is an estimate of a value relative to a population. A normed score can be expressed as a percentage score, a standard deviation score (e.g., a T-score or Z-score), and so on. In some examples, the population could be a general population. In other examples, the population could be a population which is similar to the subject. As described further below, signal processing and deep-learning methods are applied to the speech sample 116 in order to characterize acoustic features of the speech patterns (including articulation accuracy) of the human subject 118.

The approach described herein provides objective measures that will allow for characterization of age-based developmental norms for the PLLR. The objective norm-based approach is enabled by machine-learning algorithms which model the contributions of phoneme acoustics to intelligibility. This insight into intelligibility provides clinicians with new information upon which to select treatment targets and measure treatment outcomes automatically, sensitively, and without perceptual bias. By understanding and characterizing how phoneme integrity relates to intelligibility in typical development, this approach provides greater understanding of parallel relationships in children with dysarthria (or any speech disorder) and can directly indicate intervention targets for articulation that will have the largest impact on intelligibility if remediated. Indeed, intelligibility-based information may be more important than age-norm information for selecting treatment targets for remediation in pediatric dysarthria in cerebral palsy (CP) and other speech disorders.

The speech processing approach described herein is flexible and scalable, allowing embodiments to generate the PLLR phoneme precision metric relative to different reference databases. Examples described herein use mature production data to generate normative distributions of articulatory precision development by age and phoneme to establish a range of typical development and to quantify the distance from mature production for any given child (typical or dysarthric) on any given phoneme at any given age. In other examples, this reference can be easily changed to focus on (or include) other pediatric populations (e.g., cleft palate, hearing impairment, childhood apraxia of speech).

Figure 3:
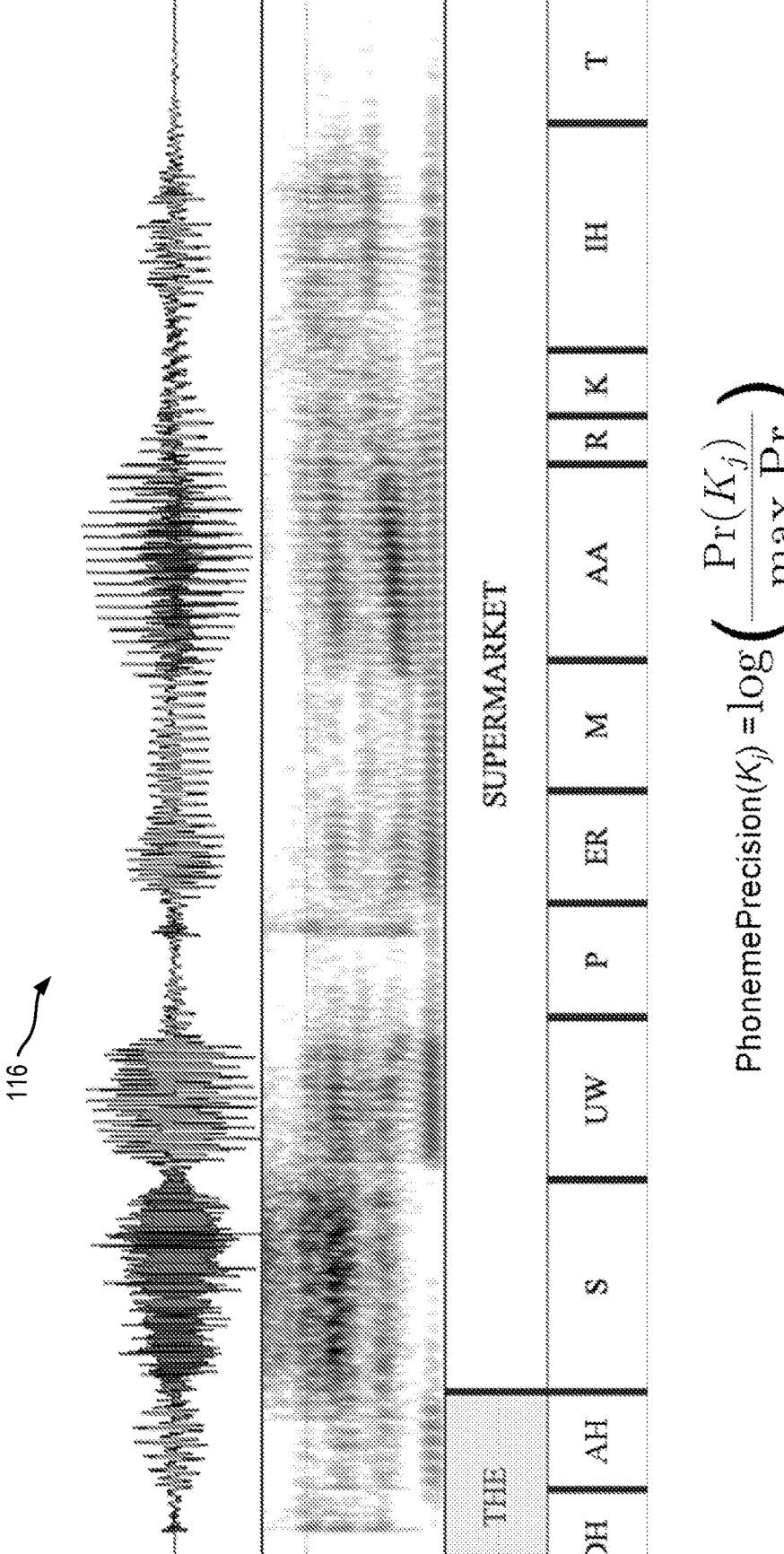
FIG. 3 is a graphical representation of acoustic features of a speech sample, separated into phonemes.

In this regard, FIG. 3 is a graphical representation of acoustic features of a speech sample 116, separated into phonemes. The illustrated speech sample 116 is connected speech elicited from a speaker (e.g., the human subject 118 of FIG. 1) using a transcript. In some embodiments, the speech sample 116 may instead by a spontaneous speech sample.

Human speech in a given language can be divided into phonemes, which are a sound or group of sounds perceived by speakers of the language to have a common linguistic function. Examples include consonant sounds (e.g., the English /k/, as in cat or kit), vowel sounds (e.g., the English /i:/, as in it or busy), or combinational sounds (e.g., the English /ŋ/, as in sing). In the speech sample 116 of FIG. 3, the phrase "the supermarket" includes twelve phonemes. As described further below, embodiments assess the precision of the speech sample 116 on a phoneme-by-phoneme basis. A phoneme precision metric can be defined as $$PhonemePrecision(K_j) = \log\left(\frac{Pr(K_j)}{\max Pr}\right)$$

where $K_j$ is the jth instance of a given phoneme K in the speech sample 116.

Figure 4:
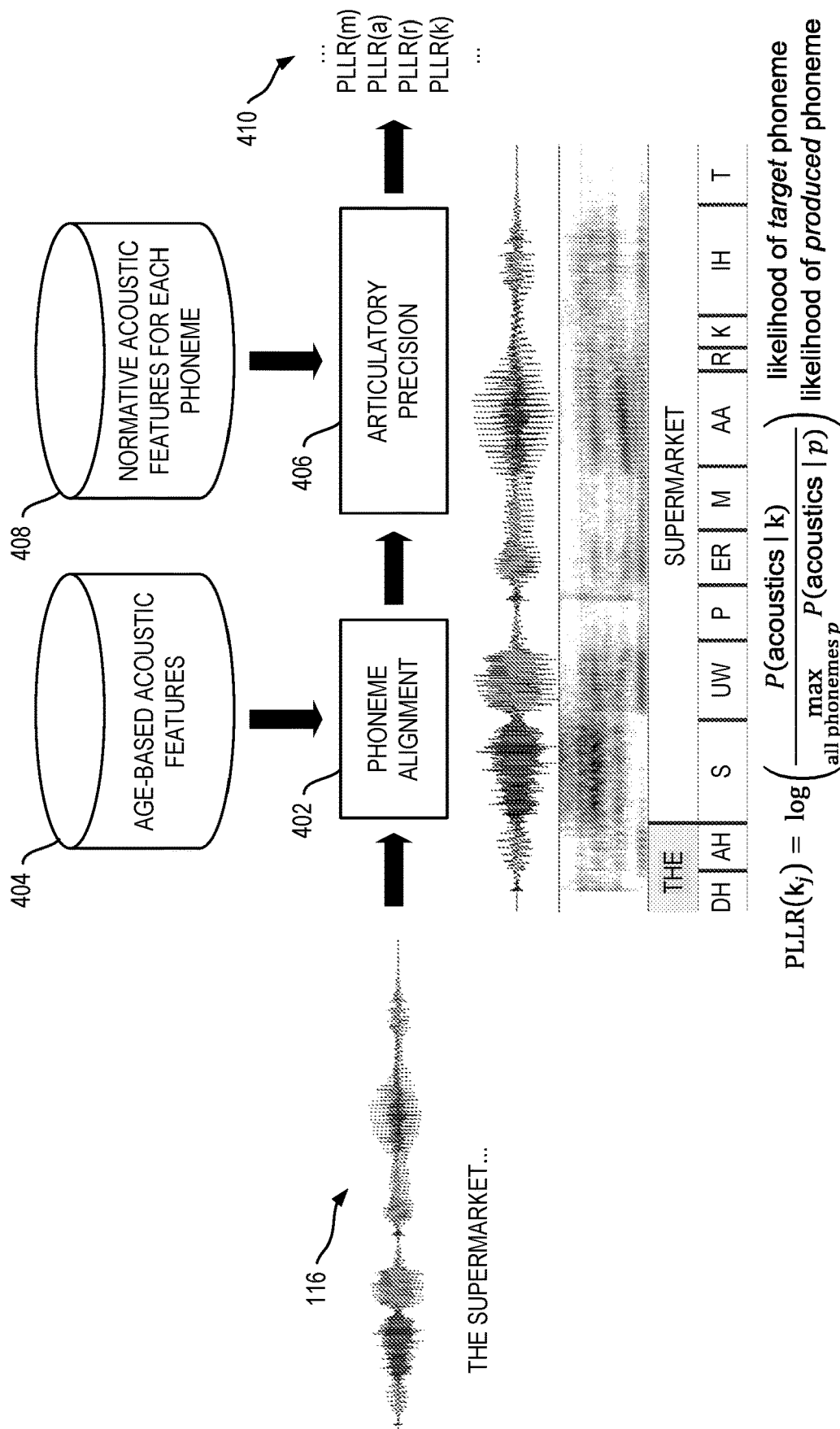
FIG. 4 is a diagram depicting an exemplary method for processing a speech sample to provide an objective assessment of articulatory precision on a per-phoneme basis.

FIG. 4 is a diagram depicting an exemplary method for processing the speech sample 116 to provide an objective assessment of articulatory precision on a per-phoneme basis. The method may be implemented with the speech processing system 100 of FIG. 1 or the speech processing system 200 of FIG. 2. The method provides a front-end application that allows users, such as health care professionals (including physicians and speech-language pathologists) or parents, to elicit speech from human subjects (e.g., children). The method further provides a suite of back-end algorithms that process collected samples to provide clinicians and other users with easy-to-interpret and actionable outcomes. These outcomes can be compared against developmental norms to track speech development in children and to provide primary targets for intervention, if necessary.

The method of FIG. 4 is a new method for objectively quantifying articulatory precision and prosody in children. These measures circumvent the methodological limitations of currently available means for assessing articulation and prosody in that they are objective in nature and do not require perceptual evaluation by clinicians.

Data generated using this method on test speech samples show that the metrics provided track reliably with clinical ratings and objective measures of intelligibility. The results hold whether the metrics are extracted from single words or from connected speech produced by children. In contrast to the current gold standard of binary perceptual judgments by speech-language pathologists, this new tool provides a continuous metric of articulatory precision and utterance prosody with high test-retest reliability. This method enables new insight into which phonemes have the greatest impact on intelligibility and which ones are primary targets for intervention for a given child. There is currently no easy way for speech-language pathologists, primary care physicians, or other clinicians to make these decisions.

Specifically, phoneme precision is quantified via a novel, rigorous, empirical, objective, and continuous scale, the PLLR. The PLLR is based on a mathematical model that computes the likelihood ratio of the acoustics of a target phoneme to the acoustics of the phoneme that was produced. The PLLR compares the input child speech to a reference database of mature speech. The method relies on filter-bank features, extracted from speech sampled at 16 kHz, to represent the acoustics of each phoneme. These features are used to generate a multidimensional statistical distribution for the acoustics of each phoneme from a large corpus of healthy adult speech.

Then, an input speech sample from a child is projected on each of these distributions to assess how the acoustics compare with the reference sample (expressed as a PLLR score). The PLLR is a normed score that estimates the articulation of a subject relative to a population (e.g., per-phoneme and/or overall). The PLLR is the log ratio of the likelihood of the correct phoneme to that of the best-estimated phoneme in the reference. This measure circumvents the limitations of currently available methods for assessing articulation in that it is objective in nature, capitalizing on an acoustic model based on a Gaussian Mixture Model plus Hidden Markov Model, and it does not require perceptual decision making by human listeners. In addition, the PLLR provides an index of precision relative to a large corpus of adult reference productions. Consequently, the PLLR provides a metric of accuracy of production that is sensitive to incremental change on a ratio scale.

FIG. 4 illustrates an algorithm for the speech processing method which includes three building blocks as follows:

1.) Acoustic model for phoneme-level alignment: The input to the algorithm is the speech sample 116, which is connected speech elicited from a speaker (i.e. human subject) of interest. In certain embodiments, the speech sample 116 is elicited based on a transcript (e.g., according to a target language sample). The target language sample and the elicited speech sample are first aligned using a phoneme alignment algorithm 402. This allows the algorithm to analyze the acoustics of each phoneme in order to measure the precision and other characteristics (e.g., duration, rhythm, volume, speaking rate, ability to properly stress individual sounds, etc.) of each phoneme separately. Generally, the transcript is carefully constructed and the analytics applied to the elicited speech are tailored to that transcript. In certain embodiments, the speech sample 116 comprises a spontaneous speech sample which is processed to identify potential phonemes and cluster the potential phonemes based on speech recognition algorithms or similar techniques.

In an exemplary aspect, the phoneme alignment algorithm 402 is trained using a database of age-based acoustic features 404. For example, if the human subject is a child, the phoneme alignment algorithm 404 may be based on an acoustic model of phonemes developed with speech samples of children within a same age band.

2.) Acoustic model for each phoneme in context: After the phoneme alignment algorithm 402, an articulatory precision algorithm 406 projects the acoustics of each frame (e.g., spectro-temporal features) within each phoneme on a statistical distribution learned from a large corpus of mature speech 408. In an exemplary embodiment, the normative distribution is estimated from a large database of read speech.

3.) Computing the PLLR: After the phoneme alignment algorithm 402 and the articulatory precision algorithm 406, for each phoneme in the input speech sample 116, a PLLR algorithm 410 calculates the likelihood of the target phoneme when projected on the normative distribution, P(acoustics|target). In addition, the PLLR algorithm 410 calculates the maximum probability over all phonemes in the normative distribution, $\max_{for\ all\ phonemes\ p}$ P(acoustics|p). Ideally, for clearly pronounced phonemes, these probabilities are the same, the ratio is 1, and the articulatory precision metric is 0. However, for imprecise phonemes, the maximum probability may occur for a different phoneme (e.g. the maximum probability may occur for /g/ instead of /k/ in the example in the figure), in which case the ratio is less than 1 and the PLLR is negative.

The overall articulatory precision of a phoneme can be estimated by averaging over the individual instances of that phoneme in the sample. This feature alone is a significant advancement from current articulation assessment practice which considers only one token of a given phoneme. Thus, the PLLR for any given phoneme reflects variability across multiple productions and in different co-articulatory contexts and is therefore a more ecologically valid representation of phoneme precision for any given child. For the example in FIG. 4, the average articulatory precision of the phoneme /k/ is given by the equation below where $N_k$ is the number of instances of the phoneme /k/ in the transcript:

$$PLLR(k) = \frac{1}{N_k} \sum_{k_j \in\ all\ instances\ of\ /k/} PLLR(k_j)$$

10

Similarly, the algorithm can estimate the articulatory precision of a subset of phonemes of interest (e.g. consonants, vowels, stops, all phonemes, etc.) by averaging over that subset:

$$ArticulatoryPrecision = \frac{1}{N} \sum_{p\in\ a\ subset\ of\ phonemes} PLLR(p)$$

The algorithms described herein also provide timing information regarding the duration of each phoneme. This timing information is used to generate metrics related to the prosody of the produced speech. These include:

Speaking rate

Stressed and unstressed vowel duration

Phoneme-specific timing information

The articulatory precision and prosody outcome measures can be combined into a measure of intelligibility, providing clinicians with a single composite score that integrates the outcomes. In this context, intelligibility refers to an estimate of the percent of words that a person unfamiliar with the child can understand.

Embodiments of the present disclosure can provide one or more of the following advantages over prior approaches:

1.) Novel objective approach. Embodiments disclosed herein provide a new set of acoustically derived normative standards for development of articulatory precision by phoneme and age. The work employs state of the art technologies in acoustic modeling based to address a novel and clinically important set of questions. The method is automated and operates directly on acoustic features of the speech signal. This feature means that the analysis can easily scale to very large sample sizes.

2.) Continuous data. Tools herein use probabilistic assessment of production/acoustic precision for every phoneme to characterize performance on a ratio scale, which enables the quantification of change in a fine-grained, continuous way. Current clinical tools for characterizing articulatory development employ interval or binary perceptual judgements that are time consuming, subjective, and too coarse to sensitively identify speech change. These automated analyses are time-efficient and objective.

3.) Longitudinal characterization. Existing speech samples from children between the ages of 3 and 9 years can be used to quantify the development of articulatory precision and prosody in typically developing children. In addition, longitudinal changes in speech of a subject can be tracked and analyzed.

4.) Clinical application. Embodiments disclosed herein have direct clinical application. They can be used by clinicians or parents to track their children's speech. They are applicable across a wide range of populations including children with dysarthria, cleft palate, hearing impairment, childhood apraxia of speech, etc.

Evaluation results: FIGS. 5, 6A, 6B, 7A, and 7B illustrate results from an evaluation of an exemplary embodiment of the exemplary method for processing speech samples of FIG. 4. The evaluation provides an analysis of a pilot group of 45 typically developing children aged three years, zero months through six years, eleven months. These results confirm that the speech processing approach described herein accurately assesses development of speech on a per phoneme basis. In some embodiments, these results (or similar results, such as with a larger sample) may form at least part of a database of speech features against which new speech samples are evaluated.

Figure 5:
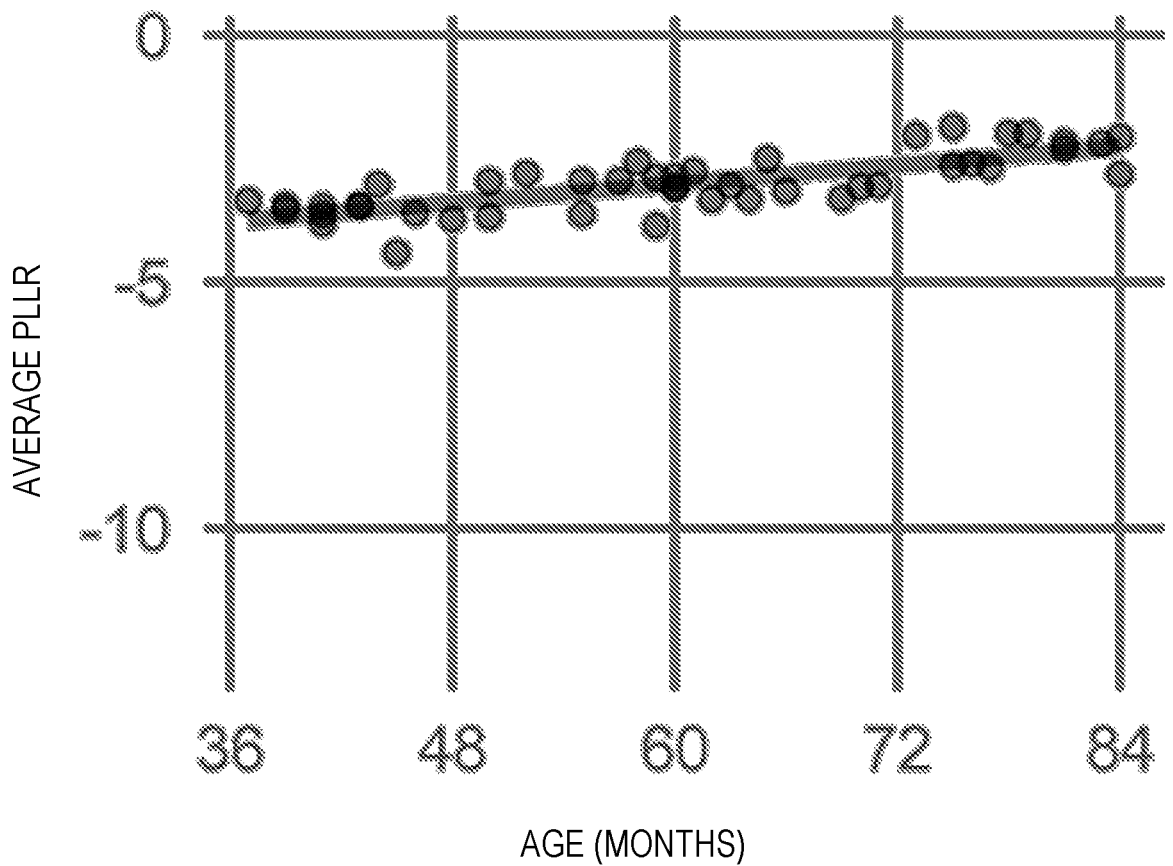
FIG. 5 is a graphical representation of average phoneme log-likelihood ratio (PLLR) scores across 38 phonemes by age.

FIG. 5 is a graphical representation of average PLLR scores across 38 phonemes by age. Results indicate a linearly improving trend such that PLLR scores on average become better and slightly less variable with age.

Figure 6A:
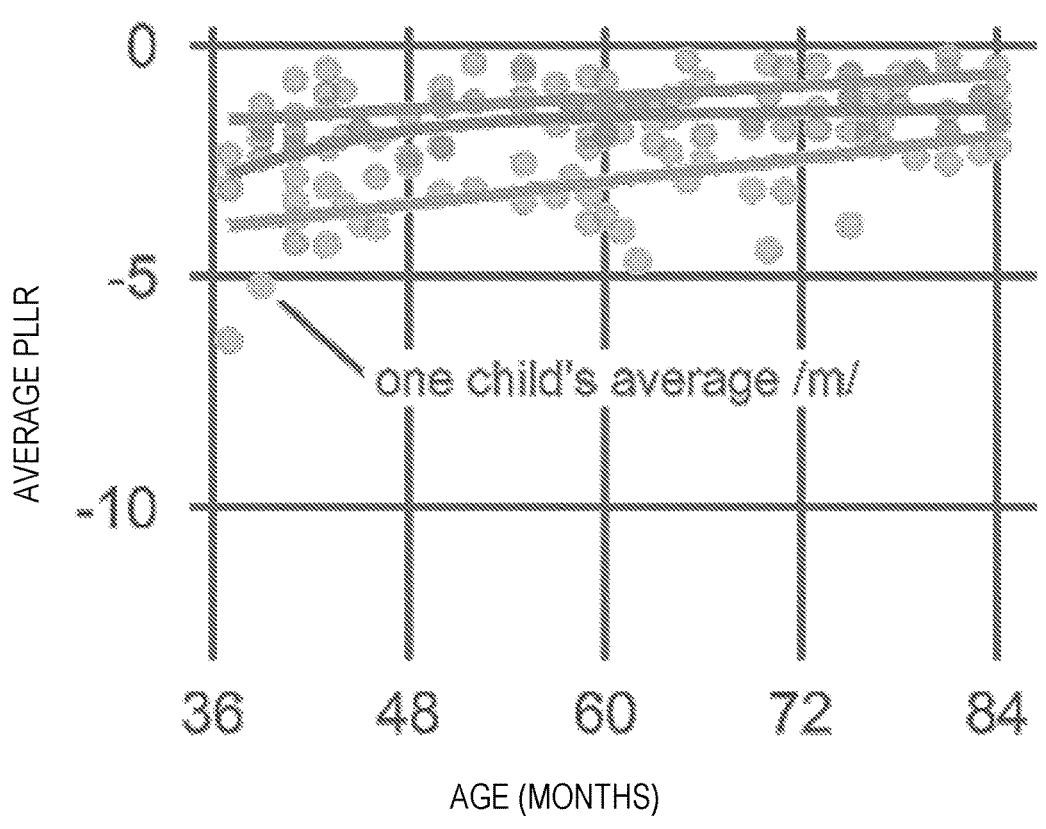
FIG. 6A is a graphical representation of average PLLR scores by phoneme for low complexity phonemes.
Figure 6B:
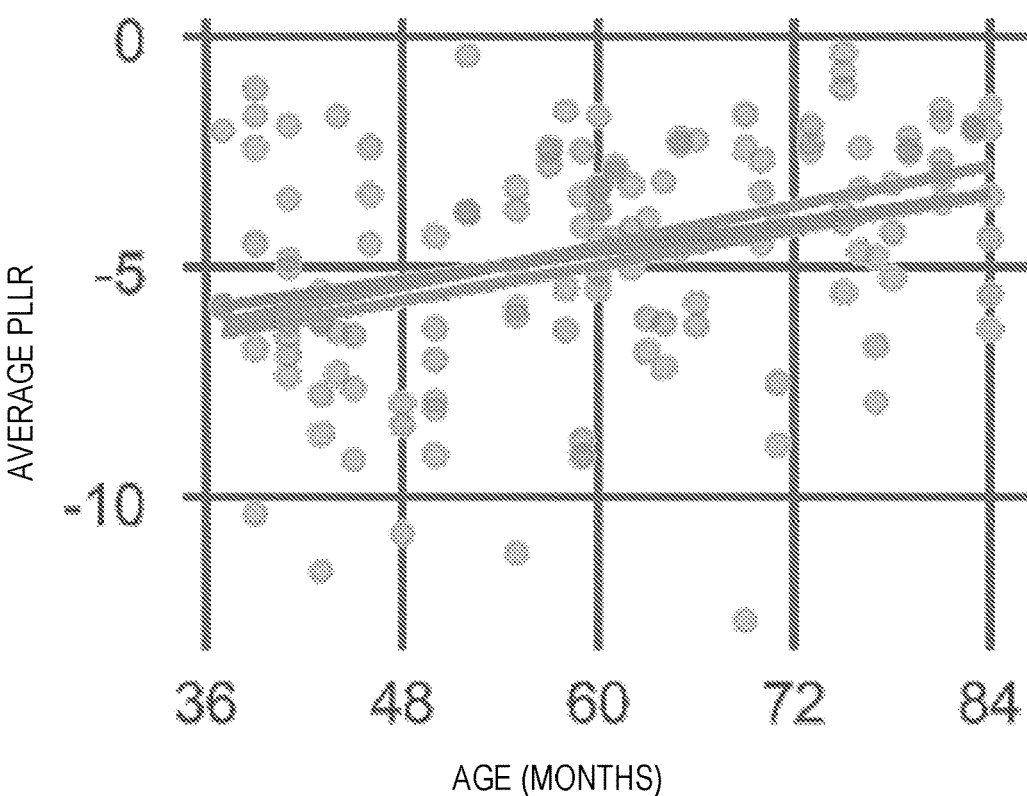
FIG. 6B is a graphical representation of average PLLR scores by phoneme for high complexity phonemes.

FIG. 6A is a graphical representation of average PLLR scores by phoneme for low complexity phonemes. FIG. 6B is a graphical representation of average PLLR scores by phoneme for high complexity phonemes. In this exemplary embodiment, mean PLLR values are shown for each child. In other embodiments, the phoneme means are decomposed at the child level into the proportion (probability) of perfect PLLR and the average nonzero PLLR components, providing a more granular view of growth and yielding the flexibility needed to estimate key quantiles by age. The illustrated data shows (a) clear growth by age towards the maximum of PLLR=0, (b) reduced variability in PLLR response for higher articulatory precision, and (c) a clear separation in trajectory by motor complexity levels. Overall, these results provide validation that the PLLR tracks with developmental expectations.

Figure 7A:
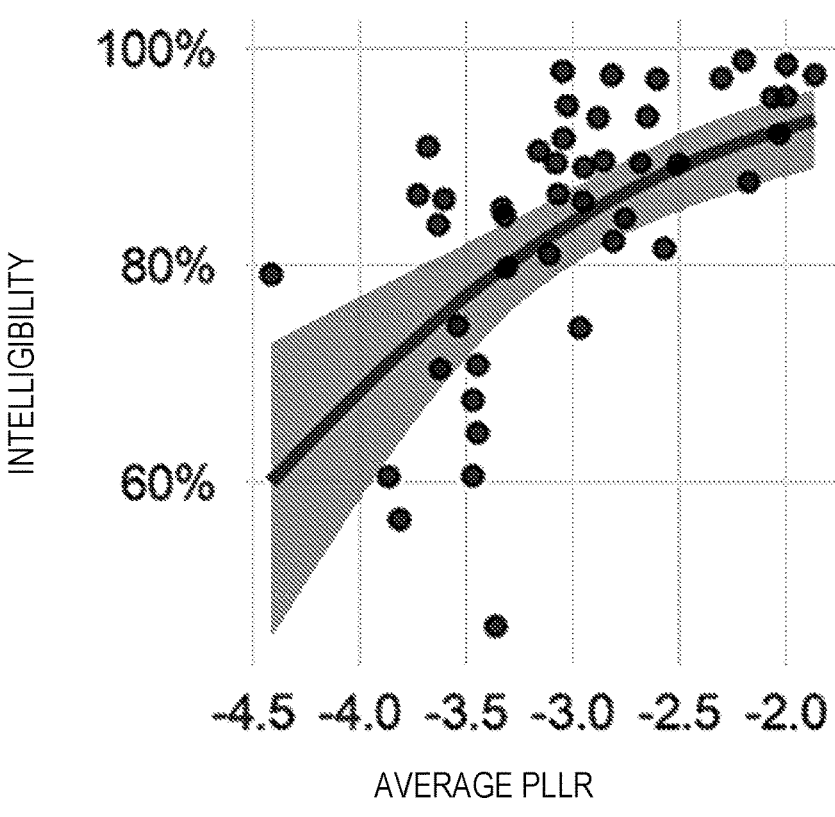
FIG. 7A is a graphical representation of intelligibility as a function of average PLLR score for each child in single and multiword productions.
Figure 7B:
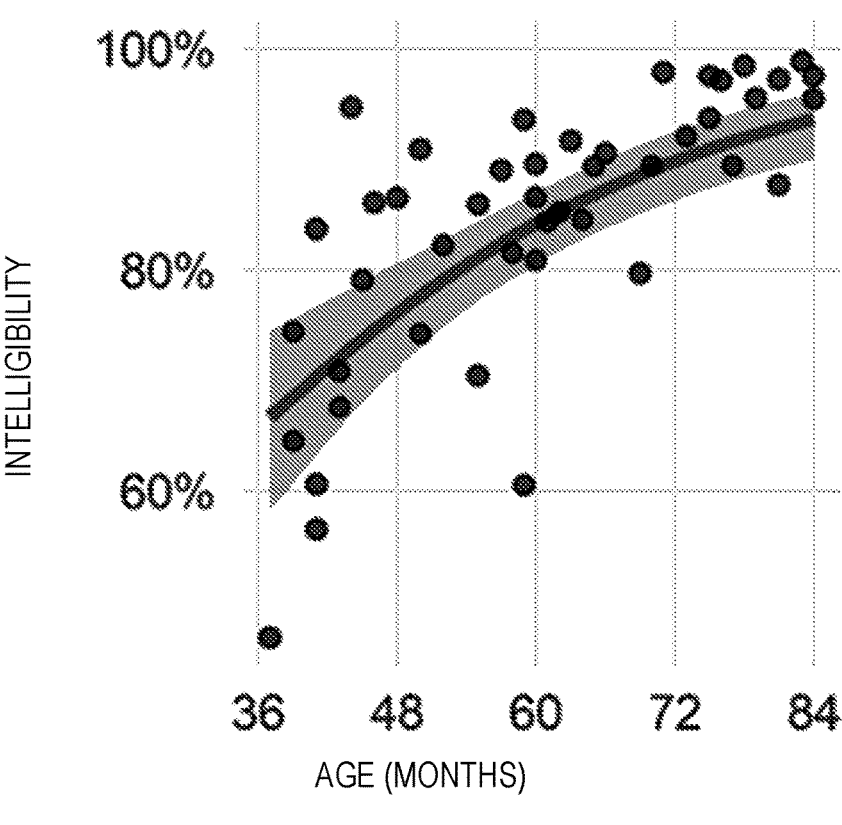
FIG. 7B is a graphical representation of intelligibility as a function of age for each child in single and multiword productions.

FIG. 7A is a graphical representation of intelligibility as a function of average PLLR score for each child in single and multiword productions. FIG. 7B is a graphical representation of intelligibility as a function of age for each child in single and multiword productions. These results use estimates from a Beta-logistic regression. Not only does intelligibility increase dramatically with age, as expected, but also with mean PLLR. In some embodiments, mean PLLR at the child level is decomposed into phoneme-specific contributions to provide a more nuanced quantification of the importance of each phoneme to intelligibility. In addition, broad correlations between phoneme groups and intelligibility show promise for these analyses.

Figure 8:
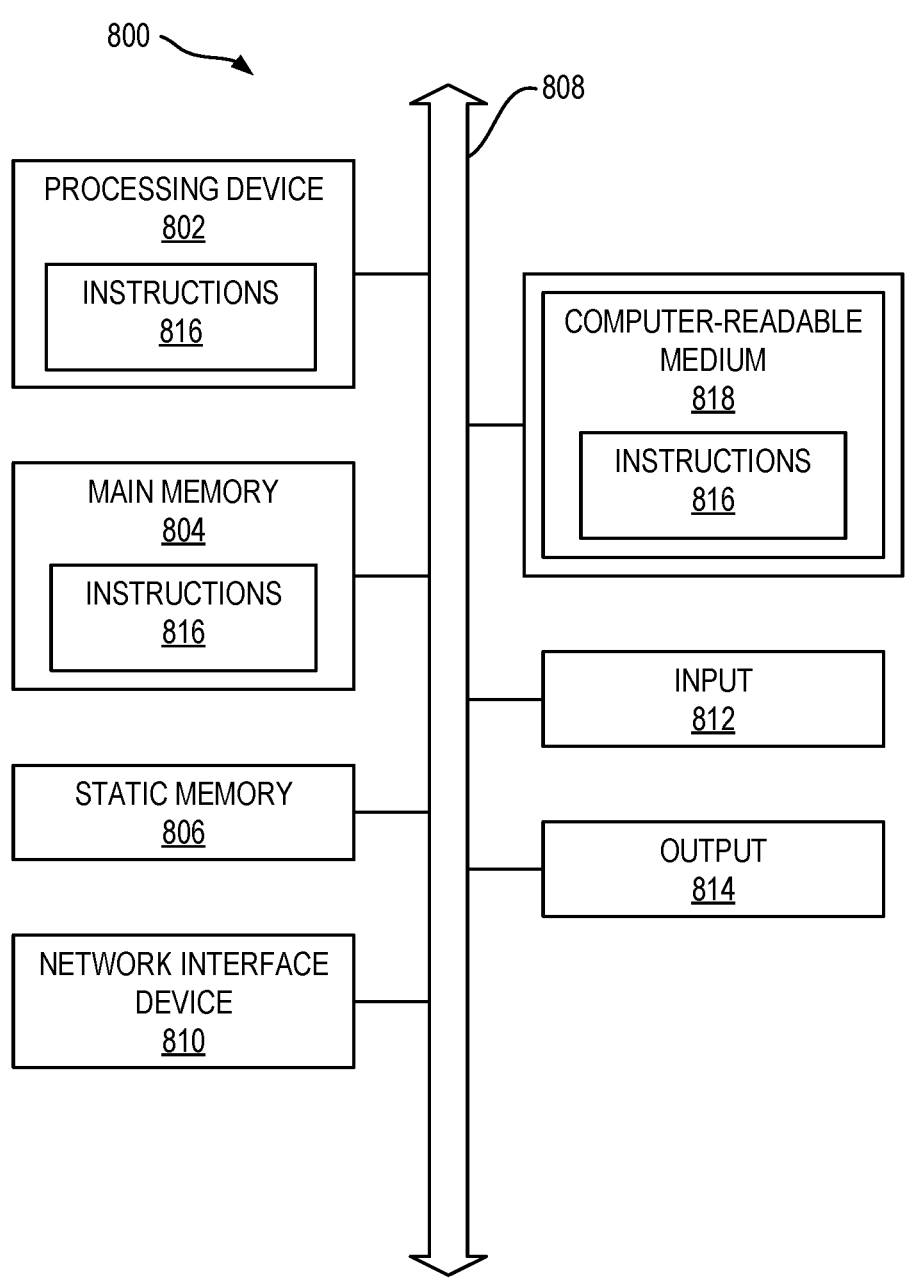
FIG. 8 is a schematic diagram of a generalized representation of an exemplary computer system that could be used to perform any of the methods or functions described herein, such as processing a speech sample of a human subject to provide a normed score of articulatory accuracy on a per-phoneme basis.

FIG. 8 is a schematic diagram of a generalized representation of an exemplary computer system 800 that could be used to perform any of the methods or functions described above, such as processing a speech sample of a human subject to provide a normed score of articulatory accuracy on a per-phoneme basis. In some examples, the speech processing device 102 of FIG. 1, the user device 202 of FIG. 2, and/or the client device 206 is implemented as the computer system 800. In some examples, the speech processing device 102 is coupled to the computer system 800 (e.g., implemented on the server 106). In this regard, the computer system 800 may be a circuit or circuits included in an electronic board card, such as, a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 800 in this embodiment includes a processing device 802 or processor, a main memory 804 (e.g., read-only memory (ROM), flash memory, dynamic random access memory (DRAM), such as synchronous DRAM (SDRAM), etc.), and a static memory 806 (e.g., flash memory, static random access memory (SRAM), etc.), which may communicate with each other via a data bus 808. Alternatively, the processing device 802 may be connected to the main memory 804 and/or static memory 806 directly or via some other connectivity means. In an exemplary aspect, the processing device 802 could be used to perform any of the methods or functions described above.

The processing device 802 represents one or more general-purpose processing devices, such as a microprocessor, central processing unit (CPU), or the like. More particularly, the processing device 802 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 802 is configured to execute processing logic in instructions for performing the operations and steps discussed herein.

The various illustrative logical blocks, modules, and circuits described in connection with the embodiments disclosed herein may be implemented or performed with the processing device 802, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 802 may be a microprocessor, or may be any conventional processor, controller, microcontroller, or state machine. The processing device 802 may also be implemented as a combination of computing devices (e.g., a combination of a DSP and a microprocessor, a plurality of microprocessors, one or more microprocessors in conjunction with a DSP core, or any other such configuration).

The computer system 800 may further include a network interface device 810. The computer system 800 also may or may not include an input 812, configured to receive input and selections to be communicated to the computer system 800 when executing instructions. The computer system 800 also may or may not include an output 814, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 800 may or may not include a data storage device that includes instructions 816 stored in a computer-readable medium 818. The instructions 816 may also reside, completely or at least partially, within the main memory 804 and/or within the processing device 802 during execution thereof by the computer system 800, the main memory 804, and the processing device 802 also constituting computer-readable medium. The instructions 816 may further be transmitted or received via the network interface device 810.

While the computer-readable medium 818 is shown in an exemplary embodiment to be a single medium, the term "computer-readable medium" should be taken to include a single medium or multiple media (e.g., a centralized or distributed database, and/or associated caches and servers) that store the one or more sets of instructions 816. The term "computer-readable medium" shall also be taken to include any medium that is capable of storing, encoding, or carrying a set of instructions for execution by the processing device 802 and that causes the processing device 802 to perform any one or more of the methodologies of the embodiments disclosed herein. The term "computer-readable medium" shall accordingly be taken to include, but not be limited to, solid-state memories, optical medium, and magnetic medium.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for processing speech, the method comprising:

generating from production data of normative speech samples of a plurality of mature speakers, a plurality of statistical models defining production characteristics associated with a respective target phoneme of a plurality of target phonemes of a target language sample;

receiving, from a human subject having an associated age, a speech sample including a plurality of phonemes;

extracting acoustic features from the speech sample of the human subject including a plurality of spectro-temporal patterns;

aligning the speech sample with the target language sample to identify, for each target phoneme of the plurality of target phonemes, a plurality of instances of the target phoneme in the speech sample and to analyze acoustics of each instance of the phoneme relative to a respective target phoneme of the plurality of target phonemes of the target language sample;

assessing, probabilistically, for articulatory precision and other characteristics of each of the plurality of target phonemes elicited by the human subject in the speech sample separately relative to a respective target phoneme of the plurality of target phonemes of the target language sample, including, for each instance of a given phoneme:

projecting the acoustic features of each frame of the speech sample within the instance on a respective statistical model of the plurality of statistical models, and computing, for the given phoneme, a normed score including phoneme log-likelihood ratio (PLLR) values from the acoustic features of the speech sample as projected on the respective statistical model of the plurality of statistical models, including:

determining, for each instance of the given phoneme, a ratio of:

a probability of a correct pronunciation of a given phoneme of the speech sample relative to a respective target phoneme, to a maximum probability of a correct pronunciation of other phonemes of the speech sample relative to respective target phonemes, and applying a logarithmic transformation to the ratio to obtain a PLLR value for each instance of the given phoneme;

for each given phoneme of the plurality of target phonemes, aggregating the PLLR values over all instances of the given phoneme in the speech sample to compute an average articulatory precision metric for the given phoneme; and for each given phoneme of the plurality of target phonemes, comparing the average articulatory precision metric with a normative distribution of articulatory precision development by age and phoneme derived from PLLR values of a population of typical speakers to compute a normed score that quantifies a distance of the human subject from mature production for the given phoneme at the associated age.

2. The method of claim 1, wherein the normed score is a percentile score.

3. The method of claim 1, wherein the normed score is one of a T score or a Z score.

4. The method of claim 1, wherein:

the target language sample comprises a selected set of elicitations.

5. The method of claim 1, wherein the target language sample includes target instances of each of a plurality of target phonemes across multiple phonetic contexts.

6. The method of claim 1, wherein the plurality of statistical models accounts for the multiple phonetic contexts of the speech sample.

7. The method of claim 1, wherein the speech sample comprises a spontaneous speech sample.

8. The method of claim 7, further comprising separating the speech sample into potential phoneme instances using the plurality of spectro-temporal patterns; and associating each of the potential phoneme instances with the given phoneme or another phoneme.

9. The method of claim 8, further comprising using a speech recognition algorithm to associate each of the potential phoneme instances with a corresponding phoneme of the plurality of phonemes.

10. The method of claim 1, wherein the plurality of statistical models comprises averages of estimates of correct pronunciation.

11. The method of claim 1, further comprising identifying instances of the given phoneme including all instances of the given phoneme in the speech sample.

12. The method of claim 1, wherein the normed score comprises a raw score compared with correct adult speech.

13. The method of claim 12, wherein producing the normed score further comprises comparing the raw score with a distribution of raw scores based on an age of the human subject.

14. A method for assessing speech, the method comprising:

accessing a first speech sample of a human subject;

spectrally sampling the first speech sample;

analyzing the spectrally sampled first speech sample to separate the first speech sample into a plurality of instances of a plurality of phonemes;

for each given phoneme of the plurality of phonemes, analyzing acoustic features of the plurality of phonemes separately, including comparing each of the plurality of instances of the given phoneme with a statistical model of the given phoneme to produce an estimate of correct pronunciation, the estimate of correct pronunciation for each instance comprising a phoneme log-likelihood ratio (PLLR) value obtained by determining, for the instance, a ratio of a probability of a correct pronunciation of the given phoneme of the speech sample relative to a respective target phoneme to a maximum probability of a correct pronunciation of other phonemes of the speech sample relative to respective target phonemes, and applying a logarithmic transformation to the ratio; and

generating, for each given phoneme of the plurality of phonemes, a normed score by aggregating the PLLR values over the plurality of instances of the given phoneme in the first speech sample to compute an average articulatory precision metric for the given phoneme, and comparing the average articulatory precision metric with a normative distribution of articulatory precision development by age and phoneme derived from PLLR values of a population of typical speakers to compute the normed score as a value that quantifies a distance of the human subject from mature production for the given phoneme at the associated age.

15. The method of claim 14, wherein analyzing the spectrally sampled first speech sample comprises a forced alignment of the first speech sample with a target speech sample.

16. The method of claim 14, wherein analyzing the spectrally sampled first speech sample comprises clustering spectral patterns of the first speech sample into the plurality of phonemes.

17. The method of claim 14, further comprising:

receiving a second speech sample of the human subject taken at a different time; and comparing the second speech sample to the first speech sample to produce a longitudinal assessment of the speech of the human subject.

18. A speech processing system comprising:

a database comprising normative acoustic data for a plurality of phonemes; and audio processing circuitry coupled to the database and configured to:

produce a model of each of the plurality of phonemes based on the normative acoustic data;

receive a speech sample comprising a plurality of instances of each of the plurality of phonemes from a human subject having an associated age; and for each given phoneme, separately:

spectrally analyze the speech sample to identify the plurality of instances of the given phoneme; and compare the plurality of instances of the given phoneme to the model of the given phoneme to compute, for each instance of the given phoneme, a phoneme log-likelihood ratio (PLLR) value defining a log ratio of a probability of a correct pronunciation of the given phoneme of the speech sample relative to a respective target phoneme to a maximum probability of a correct pronunciation of other phonemes of the speech sample relative to respective target phonemes, to aggregate the PLLR values over the plurality of instances of the given phoneme in the speech sample to compute an average articulatory precision metric for the given phoneme, and to compare the average articulatory precision metric with a normative distribution of articulatory precision development by age and phoneme derived from PLLR values of a population of typical speakers to produce a normed score for the given phoneme that quantifies a distance of the human subject from mature production for the given phoneme at the associated age.

19. The speech processing system of claim 18, further comprising audio input circuitry configured to produce the speech sample from audible speech of a human subject.

20. The speech processing system of claim 18, further comprising a network server comprising the audio processing circuitry.

21. The speech processing system of claim 20, further comprising a client device coupled to the network server and configured to capture the speech sample from a human subject.

* * * * *